Dec. 17, 1957   R. B. LOCHER   2,816,383
WATER FOWL DECOY
Filed June 7, 1954
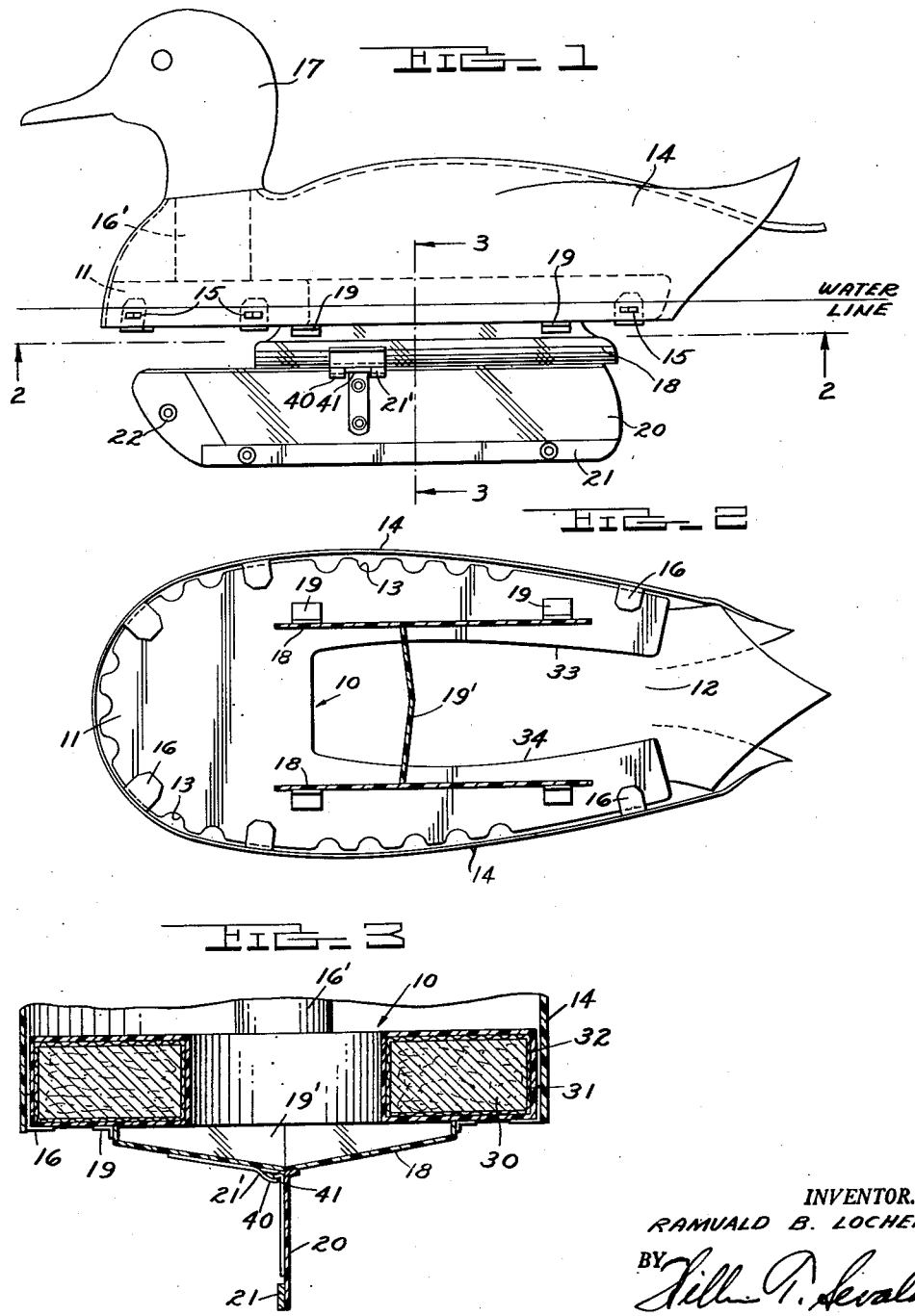
INVENTOR.
RAMUALD B. LOCHER
BY
ATTORNEY

2,816,383

WATER FOWL DECOY

Ramuald B. Locher, Royal Oak, Mich.

Application June 7, 1954, Serial No. 434,926

4 Claims. (Cl. 43—3)

This invention generally relates to floating decoys and particularly pertains to an extremely light-weight, shell-bodied and keeled decoy having a float such as for duck or other water fowl hunting which is particularly suitable for manufacture from synthetic and natural resin film-sheet and foam.

The primary object of the invention is to provide water fowl decoys which are simple in design and construction, inexpensive to manufacture, easy to use, and easy to repair without disassembling the device.

An object of the invention is to provide a decoy which can be manufactured cheaper as the component parts are easily made and the assembly of the parts can be readily accomplished.

An object of the invention is to provide a decoy which can be transported and used with ease by a hunter regardless of his skill or experience.

An object of the invention is to provide a decoy which can be adapted to all sizes of decoys by merely enlarging the various parts without destroying their arrangement.

An object of the invention is to provide a shell-like body made out of a single sheet of water impervious material formed to resemble the portion of the water fowl normally disposed above the surface of the water when floating thereon.

An object of the invention is to provide a substantially horseshoe or U-shaped float or tank with its closed end disposed at the forward end of the shell-like body and connected to the body shell around the periphery of the float so as to provide additional buoyancy in the forward area of the device.

An object of the invention is to provide a neck post on the closed, forward end of the float which independently supports the head portion of the shell area and which stabilizes the shell body portion above the float.

An object of the invention is to provide a substantially horizontal or V-shaped keel disposed below the float and connected thereto so as to entrap water therebetween to stabilize fore and aft motion of the device on the water.

An object of the invention is to provide a baffle between the substantially horizontal keel and the float to prevent water from freely running therebetween to further stabilize the fore and aft motion of the decoy.

An object of the invention is to provide a substantially vertical keel hingedly disposed below the substantially horizontal keel to stabilize the device against side-to-side bobbing and rolling motion.

An object of the invention is to provide a suitable weight on the bottom of the keel to insure that the device will float upwardly in the water.

An object of the invention is to provide anchoring means at a point on the substantially vertical keel so as to insure that the device rides properly.

An object of the invention is to provide a polystyrene or other synthetic resin foam-core for the float and a fabric layer thereover and an additional synthetic resin water impervious layer over the fabric layer to insure a substantially non-sinkable float or tank.

An object of the invention is to provide a decoy made substantially entirely of synthetic resins so as to insure its permanence, quality, and light weight.

These and other objects of the invention will become apparent by reference to the following description of a water fowl or duck decoy embodying the invention taken in connection with the accompanying drawings in which:

Fig. 1 is a side elevational view of the device such as in floating condition on the water;

Fig. 2 is a cross-sectional view of Fig. 1 taken on the line 2—2 thereof; and

Fig. 3 is a cross-sectional view of Fig. 1 taken on the line 3—3 thereof.

Referring now to the drawing wherein like numerals refer to like and corresponding parts throughout the several views, the decoy device disclosed therein to illustrate the invention comprises a substantially U-shaped or horseshoe shaped float or tank 10, which has an outer periphery conformity substantially similar to the conformity of the body of a water fowl at the water line thereof, a closed-end portion 11 at the front part of the float 10, and an open end portion 12 at the rear or aft end of the float 10. The outer edge or periphery of the float 10 may be provided with relieved grooves 13 so as to provide scuppers for draining off water occasionally disposed above the float. The body 14 of the device is preferably made of sheet synthetic resin material or film and is swaged and lanced to the shape of the body of the fowl to be imitated in that portion of the fowl disposed above the water line when swimming and the lower edge portions thereof are attached to the float by cementing or by clips 15 and L-shaped brackets 16 as seen in the drawings or in any other suitable manner. The neck post 16' is disposed on the forward end 11 of the float 10 and rises to the head 17, which it independently supports in relation to the body 14 so as to relieve strain on the sheet portion of the body and also to stabilize the sheet portion of the body in the central area above the float 10.

The body 14 has an open rearward end adjacent the float open rearward end 12 which ends cooperate together to provide a channel to allow water contained in the body shell to substantially immediately exit therefrom upon the decoy surfacing to facilitate rising to the surface. The open end 12 of the float 10 is defined by the spaced float arms 33 and 34 leading from the closed end 11.

It is to be noted that the float 10 in the closed end area 11 is preferably enlarged to create more displacement so as to provide additional buoyancy for the neck post 16' and the head 17 at the forward end of the device and reduced buoyancy or displacement at the open end 12 thereof so as to provide less buoyancy in the substantially lighter aft or tail end of the device.

Disposed below the float 10 is the substantially horizontal or V-shaped keel 18 which is attached to the float 10 by the brackets 19 or other suitable medium which are cemented to the keel and the float. The substantially horizontal keel 18 is spaced below the float 10 so that water is disposed between the keel and the float to lend stability to the device relative to fore and aft bobbing and/or rolling to eliminate the cork or log-like aspect of the device on the water and to lend it life-like stability. In this connection it is found preferable to dispose a cross-baffle 19' above the keel and below the float so as to prevent water freely travelling between the keel and the tank lengthwise of the device to further stabilize fore and aft motion.

A vertical keel 20 is hingedly connected as by the hinge 21' to the horizontal keel 18 and this keel lends side-to-side stability to the device to prevent unnatural rolling and/or bobbing, and the weight 21 is placed on the bottom of the vertical keel 20 to insure that when the device is thrown out on location and is submerged such as by strong currents, that the device will automatically rise to the surface in an upright condition and properly position itself thereon. An eyelet 22 is provided in the fore part of the vertical keel so that an anchor line can be attached thereto in the area of the device immediately below its greatest buoyancy and/or displacement so that the drag of the anchor, such as in currents, will not bias the device out of balance and cause the fore part of the device to submerge more than the aft portion thereof.

The device as preferably embodied comprises a synthetic foam core 30, such as polystyrene foam, which is then covered wtih a fabric 31, and, the fabric 31 then covered by a water impervious synthetic resin layer 32 so that the foam area 30 is never subjected to permeation by the water. It has also been found desirable to form the head 17 out of polystyrene foam in the same manner as the float 10 to provide a light weight water resistant head.

The fact that the device can be completely fabricated and manufactured from synthetic resins appears to be a great advantage due to the fact that these resins are impervious to water and are suitable to accept various colors and designs in a permanent manner so that the device does not have to be painted every year and is not subject to constant repair due to destruction by the water.

The hinge 21' is preferably of a snap two-position type so that it holds the vertical keel in the position shown in Figs. 3 and 1 and also snaps up against the bottom of the horizontal keel 18 and is held there by the spring action of the leaf 40 against the tab 41.

When the device is subject to gun shot such as in duck hunting, it can be readily repaired with a small bottle of liquid plastic by merely brushing the plastic on the body or float to repair the plastic to its former condition.

The float 10 has unsinkable and indestructible characteristics in that gun shot pellets will not cause the foam area 30 to be entirely destroyed but will only puncture that area which is contracted by the pellet so that when the device is taken out of the water, the foam area can be dried out and the aperture caused by the pellet sealed up with liquid synthetic resin.

Although but a single embodiment of the invention has been shown and described in detail, it is obvious that many changes may be made in the size, shape, detail, and arrangement of the various elements of the invention within the scope of the appended claims.

I claim:

1. A floating wild fowl decoy comprising a horse-shoe shaped float having an open and a closed end, a body shell fixed to said float with the closed end of said float positioned at the forward portion and the open end of said float positioned at the rearward portion of said body shell; said body shell having an open rearward end adjacent said float open end adapted to cooperate with said float open end to provide a channel to allow water contained in the body shell to exit therefrom; said float closed end being substantially enlarged to provide additional buoyancy in the forward end of the decoy so as to cause the forward end of the decoy to initially rise after being submerged to direct water within the body shell rearwardly out of said channel as the decoy surfaces; said float comprising a synthetic resin foam core, a water impervious fabric laminate sealed over said core, and a water impervious coating over said laminate; said float open end being defined by arm portions leading from said closed end, and a substantially horizontal keel fixed to and below said float in the area of said arm portions so as to trap a quantity of water between said float and said keel to provide a ballast.

2. A floating wild fowl decoy comprising a horseshoe shaped float having an open end and a closed end, and a body shell fixed to said float with the closed end of said float positioned at the forward portion and the open end positioned at the rearward portion of said body shell; said body shell having an open rearward end adjacent said float open end adapted to cooperate with said float open end to provide a channel to allow water contained in the body shell to exit therefrom; the forward portion of said decoy being adapted to rise to the surface of a body of water before the rearward portion thereof after being submerged therein to facilitate drainage of the water entrapped within the body shell through said channel, said float comprising a synthetic resin foam core, a water impervious fabric laminate sealed over said core, and a water impervious coating over said laminate.

3. A floating wild fowl decoy comprising a horseshoe shaped float having an open end and closed end, a body shell fixed to said float with the closed end of said float positioned at the forward portion and the open end positioned at the rearward portion of said body shell; said body shell having an open rearward end adjacent said float open end adapted to cooperate with said float open end to provide a channel to allow water contained in the body shell to exit therefrom; the forward portion of said decoy being adapted to rise to the surface of a body of water before the rearward portion thereof after being submerged therein to facilitate drainage of the water entrapped within the body shell through said channel, said float open end being defined by arm portions leading from said closed end; and a substantially horizontal keel fixed to and below said float in the area of said arm portions so as to trap a quantity of water between said float and said keel to provide a ballast.

4. A floating wild fowl decoy comprising a horseshoe shaped float having an open end and a closed end, a body shell fixed to said float with the closed end of said float positioned at the forward portion and the open end positioned at the rearward portion of said body shell; said body shell having an open rearward end adjacent said float open end adapted to cooperate with said float open end to provide a channel to allow water contained in the body shell to exit therefrom; the forward portion of said decoy being adapted to rise to the surface of a body of water before the rearward portion thereof after being submerged therein to facilitate drainage of the water entrapped within the body shell through said channel, said float open end being defined by arm portions leading from said closed end; a substantially horizontal keel fixed to and below said float in the area of said arm portions so as to trap a quantity of water between said float and said keel to provide a ballast, a vertical keel hingedly connected to said horizontal keel and adapted to extend therefrom in use, and means for retaining said vertical keel against said horizontal keel for storage.

References Cited in the file of this patent

UNITED STATES PATENTS

| | | |
|---|---|---|
| 1,503,624 | Bauman et al. | Aug. 5, 1924 |
| 1,580,074 | Olsson | Apr. 6, 1926 |
| 1,712,167 | Pontikis | May 7, 1929 |
| 2,342,107 | Agius | Feb. 22, 1944 |
| 2,435,083 | Johnson | Jan. 27, 1948 |
| 2,536,736 | Gazalski | Jan. 2, 1951 |
| 2,546,189 | Keep et al. | Mar. 27, 1951 |